United States Patent [19]

Legras

[11] 3,959,140
[45] May 25, 1976

[54] FILTER ESPECIALLY INTENDED FOR FILTERING NATURAL WATER FOR THE IRRIGATION OF CULTIVATED FIELDS

[76] Inventor: Bertrand Léon Legras, 32, rue des Petits-Pres, Epernay, Marne, France

[22] Filed: July 30, 1974

[21] Appl. No.: 493,191

[52] U.S. Cl. .............................. 210/107; 210/415; 210/489
[51] Int. Cl.² ........................................ B01D 29/04
[58] Field of Search ........... 210/107, 352, 415, 454, 210/489

[56] References Cited
UNITED STATES PATENTS

| | | | |
|---|---|---|---|
| 521,591 | 6/1894 | Lynn | 210/107 X |
| 689,440 | 12/1901 | Tuska | 210/415 X |
| 748,251 | 12/1903 | Allen | 210/415 X |
| 781,039 | 1/1905 | Weabe | 210/415 X |
| 1,439,706 | 12/1922 | Kneuper | 210/415 X |
| 2,125,532 | 8/1938 | Wells | 210/415 X |
| 3,168,467 | 2/1965 | Dreyer | 210/415 X |
| 3,285,420 | 11/1966 | Muller | 210/352 X |
| 3,556,299 | 1/1971 | Zievers et al. | 210/489 X |
| 3,747,770 | 7/1973 | Zentis | 210/489 X |

FOREIGN PATENTS OR APPLICATIONS

| 121,864 | 1/1919 | United Kingdom | 210/454 |
|---|---|---|---|

Primary Examiner—Charles N. Hart
Assistant Examiner—Robert H. Spitzer
Attorney, Agent, or Firm—Pollock, Vande Sande & Priddy

[57] ABSTRACT

The invention relates to an improved cleansable filter intended for filtering natural water for the irrigation of cultivated fields. The filter comprises a cylindrical body, a filtering element mounted inside said body and defining in the interior two concentric chambers, one communicating with the exterior through a drainage valve, and also through one of two lateral openings in the body. The other annular chamber encloses the first chamber and communicates with the exterior through the other lateral opening. The filter also comprises a brush mounted coaxially in said first chamber, said brush being rotatable manually or automatically from the exterior of the filter, and removing all foreign bodies from the inner wall of said first chamber. The liquid to be filtered enters the annular chamber through a lateral opening, passes into the first cylindrical chamber and through the filtering elements from the interior to the exterior, and leaves by the second lateral opening. The brush may be actuated manually by a crank-handle, the foreign matter being evacuated by opening the drainage valve. Alternatively, the brush may be driven by a device responsive to the pressure differences between the two chambers, the drainage valve being automatically opened at the same time.

The filter and its constituent parts are designed so as to withstand pressures of the order of 10 bars without tearing or deformation.

11 Claims, 6 Drawing Figures

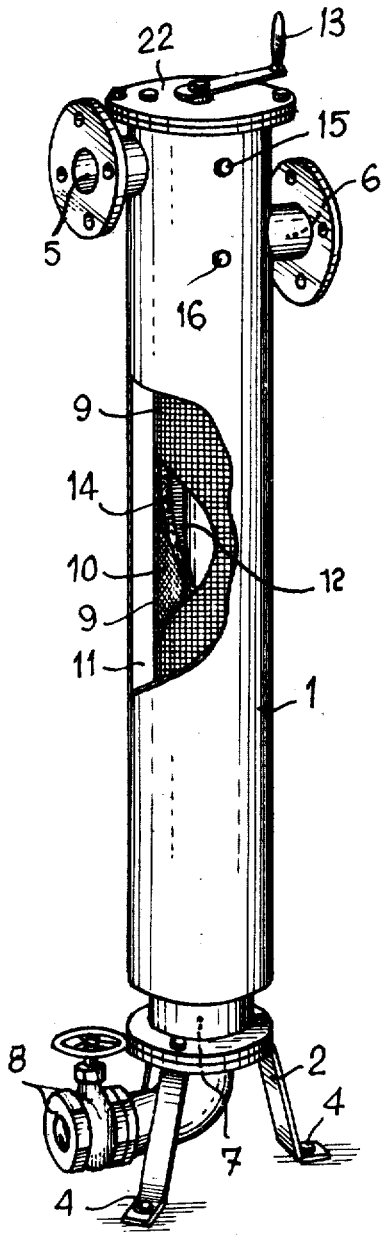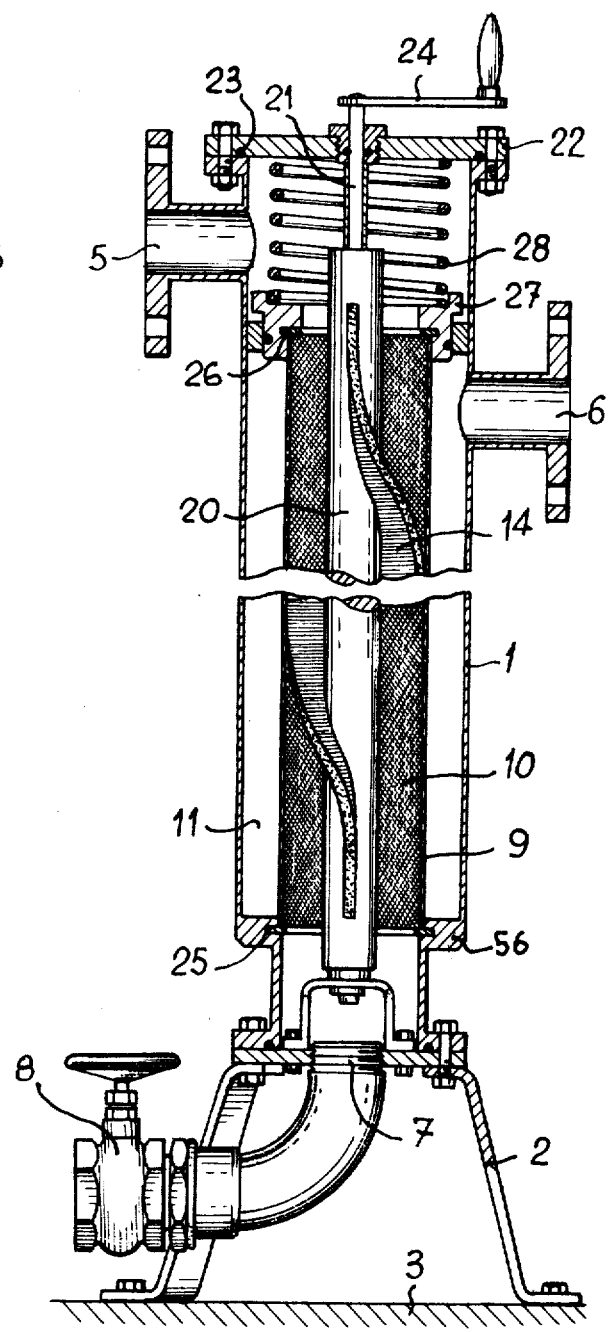

FILTER ESPECIALLY INTENDED FOR FILTERING NATURAL WATER FOR THE IRRIGATION OF CULTIVATED FIELDS

The invention relates to a filter especially intended for the filtration of natural untreated water for the irrigation of cultivated fields.

It is known to filter the irrigation water for cultivated fields, taken from a lake, a pond, a stream or a well.

The filters intended for this use must be particularly robust; furthermore, it is essential that their maintenance should be as convenient and rapid as possible.

Now, the filters employed up to the present time comprise filtering elements of cylindrical or other shape, designed so as to be traversed by a centripetal flow of water, so that they become gradually choked on their outer walls and it is necessary to dismantle them and remove them from the body of the filter in order to clean them. Generally, furthermore, the user prefers to use them as long as possible without cleaning them and, when he considers that the flow-rate of the filter is too small or that the pressure losses of the filtration element are too large, he dismantles the filter and replaces the filtering element by a new element. By proceeding in this way, the user:

on the one hand leaves his filter in operation under very bad conditions which are liable to result in fluctuations of pressure affecting the regularity of the irrigation flow, especially in the case of a drop-by-drop irrigation by means of capillary devices;

on the other hand, loses an appreciable time in dismantling, cleaning or replacing the filtering elements;

finally, is liable to consume large quantities of filtering elements.

In addition, it would be desirable, in certain cases, for the filters, and especially the filtration elements, when they are choked-up, to be capable of withstanding pressures of the order of about ten bars without deterioration; this is especially the case in mountainous country when the irrigation water is brought-in through pressure conduits. Now, the filtering elements traversed by a centripetal flow cannot withstand high pressures and become crushed or torn when they are choked.

The present invention has for its object to remedy these drawbacks, on the one hand by producing a particularly robust filter comprising a filtering element which can be cleaned manually or automatically from the exterior of the filter, and on the other hand, a filtering element designed to withstand high pressures.

The filter according to the invention comprises:
a body communicating with the exterior by two lateral openings and a drainage opening, the said drainage opening being temporarily closed;
a filtering element mounted inside the body and forming two concentric chambers inside the said body:
one, the first, communicating with the exterior, on the one hand through the temporarily closed opening, and on the other hand, through one of the lateral openings;
the other, of annular shape surrounding the first, communicating with the exterior through the other lateral opening.

According to an essential characteristic feature of the invention, the filter comprises a brush located inside the first chamber, actuatable from the exterior, the bristles of which sweep the inside wall of the filtering element.

The liquid to be filtered, in particular water, passes into the filter through the lateral opening communicating with the first chamber and leaves the filter through the lateral opening communicating with the annular chamber after having passed through the filtering element from the interior to the exterior.

Due to this centrifugal circulation of the water through the filtering element, it is the inside wall of this latter which is gradually choked-up by the impurities.

Thus, by working from the exterior, the brush mounted inside the first chamber, the user can rapidly clean the inner wall of the filtering element, without it being necessary to dismantle the filter. This brush may be of different kinds; in particular it may be a type of fluebrush displaced by the user in translation along the longitudinal axis of the body. The essential condition is that the bristles of the brush can sweep the inner wall of the filtering element.

Preferably, however, and according to another essential characteristic feature of the invention, this brush is composed:
of a shaft movable in rotation, located on the longitudinal axis of the body; one of its extremities passes through the removable cover which gives a fluid-tight closure to one of the extremities of the body;
of bristles fixed on the cylindrical shaft and arranged radially along a helix completely surrounding this shaft, and having sufficient length to sweep the internal wall of the filtering element;
of a crank-handle situated outside the body and rigidly fixed on the extremity of the shaft which passes through the removable cover.

In addition, the winding direction of the helix is such that when the user turns the crank-handle in a clockwise direction, the particles removed from the wall of the filtering element are carried away towards the drainage opening.

The filter is preferably placed vertically on the ground, the drainage opening being located at the lower portion, so that the particles removed by the brush are carried away, at the same time by a powerful flow of water and by the shape of the brush, towards the exterior, the brushing operation being carried out with the drainage pipe open. Also, the crank-handle actuating the brush is preferably located at the upper part of the filter.

According to an additional characteristic feature of the invention, the filtering element is mounted in a removable and fluid-tight manner inside the body of cylindrical shape by means:
of a first sealing joint held in position in a groove formed in one of the extremities of the body, and against which one of the extremities of the filtering element of circular form is in abutment;
of a second sealing joint on which the other extremity of the filtering element is also in abutment, the said second joint being fixed on an annular ring having substantially an L-section;
of the said annular ring co-operating especially with the body, sliding inside the cylindrical body in a fluid-tight manner; of a spring located inside the body and supported on the one hand on the annular ring and on the other under the removable cover, and urging the said annular ring into abutment against the filtering element through the intermediary of the joint.

The brush may be actuated otherwise than by a crank-handle, for example automatically by means of an electric motor controlled in particular by a timing device in order that the internal wall of the filtering element can be brushed regularly. It is preferable that the particles removed by the brush and which fall to the bottom of the filter should be immediately evacuated. This drainage operation may also be made automatic by using a gate-valve assisted and controlled by the same timing device.

Preferably however, and according to an additional characteristic feature of the invention, the filter is such that the valve which temporarily closes the opening located in the longitudinal axis of the vertical cylindrical body and at the lower part of this body, is assisted and controlled by a device responsive to the difference in pressures between the two chambers. Furthermore, the filter is also provided with a turbine mounted in series with the assisted valve driving in rotation, by means of a mechanical transmission member, the brush intended to clean the filtering element.

According to a subsidiary feature of the invention, the mechanical transmission member is a system of belt and pulleys comprising pulleys fixed on the shaft of a turbine and on the shaft of the brush passing in a fluid-tight manner through the lower portion closing the body of the filter. This member may however be of any other kind, and in particular it may consist of a gear, or alternatively the shaft of the turbine may be directly coupled to that of the brush.

According to another essential characteristic feature of the invention, the filtering element is composed of three concentric cylindrical portions which fit into each other:
   On the inside, a gauze of stainless steel or phosphor-bronze of of synthetic thread, the meshes of which of small dimensions have sides of a few multiples of ten microns;
   on the outside, a sheet of stainless steel perforated with openings having sides of a few millimetres;
   between these two, a gauze of stainless steel or a perforated steel sheet, the meshes or the holes of which have sides of a few tenths of a millimetre.

Due to the centrifugal circulation of the water through the filtering element, and by virtue of its structure, the filtering element is capable of withstanding pressures of the order of ten bars, even when it is blocked-up.

Preferably, and according to an additional feature of the invention, the dimensions of the gauzes and sheets composing the filtering element are as follows:
   The meshes of the internal gauze of the filtering element are square and have dimensions comprised between 40 microns and 180 microns;
   the stainless steel sheet of the filtering element is perforated with square holes having sides of between 6 millimetres and 20 millimetres, separated from each other by strips having a width between 2 millimetres and 10 millimetres.
   the intermediate gauze or perforated sheet of the filtering element has a square mesh or holes, the dimensions of which are between 0.5 millimetre and 2 millimetres.

There will now be described, by way of non-restrictive examples, forms of embodiment of the invention, reference being made to the accompanying drawings, in which:

FIG. 1 is a view in broken perspective showing the filtering element situated inside the filter according to the invention;

FIG. 2 is a view in longitudinal section of the filter shown in FIG. 1;

Figure 2A:
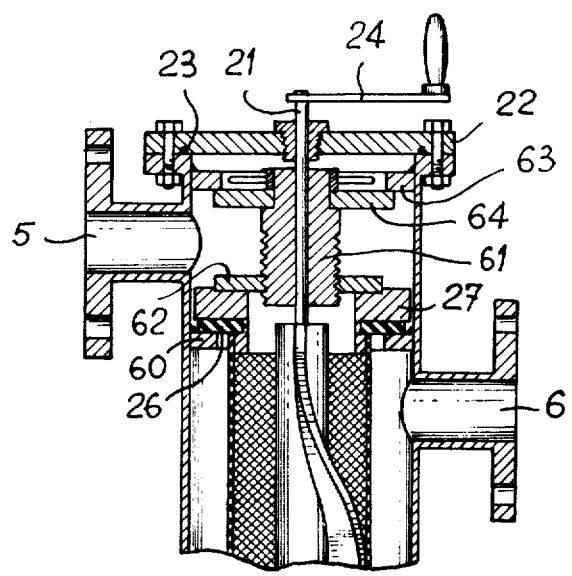
FIG. 2a is a partial view in longitudinal section, of an alternative form of construction of the filter shown in FIG. 1.

FIG. 1 represents a view in broken perspective showing the filtering element located in the interior of the filter according to the invention. This filter comprises a cylindrical body 1 arranged vertically on a base 2 fixed to the ground 3 by fixing members 4. The body is preferably of stainless steel. The cylindrical body 1 communicates with the exterior by two lateral openings 5 and 6 and an opening 7, located in the longitudinal axis of the body and temporarily closed by a valve 8. This filter is provided internally with a cylindrical filtering element 9, mounted in a removable manner inside the body 1. This filtering element 9 defines two concentric chambers 10 and 11 inside the body 1:
   One chamber 10 of cylindrical shape communicates as can be seen by referring to FIG. 2, with the exterior, on the one hand through the opening 7 temporarily closed by the valve 8, and on the other hand through the lateral opening 5;
   the other chamber 11 of annular shape, surrounds the first chamber and communicates with the exterior through the other lateral opening 6.

This filtering element 9 is provided in its interior with a brush 12 intended to clean the filtering element and actuatable from the outside by means of a crank-handle 13, and the bristles 14 of which sweep the internal wall of the filtering element.

The water passes into the filter through the lateral opening 5 communicating with the cylindrical chamber, and leaves the filter through the lateral opening 6, after having passed through the filter from the interior to the exterior.

There will be observed on the body 1 of the filter two openings 15 and 16 permitting the measurement of the pressure inside each of the two chambers. The advantage of these pressure measurements will become apparent later with reference to FIG. 3.

FIG. 2 represents a view in longitudinal section of the filter illustrated in FIG. 1.

There will be recognized the greater part of the elements described with reference to FIG. 1, in particular the body 1 mounted on the base 2 fixed to the ground 3. The filtering element 9 defines inside the body a cylindrical chamber 10 and an annular chamber 11, the cylindrical chamber communicating with the exterior:
   on the one hand through the lateral opening 5;
   on the other hand, through an opening 7 located at the lower part of the body, along the longitudinal axis of this body.

The annular chamber 11 communicates with the exterior through the lateral opening 6.

The brush which can be operated from the exterior is composed of a cylindrical shaft 20, movable in rotation, located along the longitudinal axis of the body. The upper extremity 21 of this cylindrical shaft passes through the removable cover 22 which closes in a fluid-tight manner, by means of a sealing joint 23, the extremity of the body opposite to the axial opening 7 temporarily closed by the valve 8.

The cylindrical shaft of the brush is preferably of stainless metal. The bristles 14, fixed on the cylindrical shaft 20, are arranged radially along a helix which completely surrounds this shaft; the bristles are preferably of synthetic fibre. The length of the bristles is such that they touch the internal wall of the filtering element. A crank-handle 13, located outside the filter, is fixed on the extremity 21 of the shaft of the brush which passes through the removable cover.

The filtering element 9 is mounted in a removable and fluid-tight manner inside the body, by means:
of a first sealing joint 25 fixed on the lower extremity of the cylindrical body against which the filtering element is in abutment;
of a second sealing joint 26, against which the other extremity of the filtering element is in abutment.

This second joint 26 is fixed on an annular ring 27 made of plastic material and having an L-shaped section.

This annular ring 27 slides in a fluid-tight manner inside the cylindrical body. A spring 28 of stainless steel or of surface-treated steel, located inside the body and supported:
on the one hand on the annular ring 27;
on the other hand underneath the removable cover 22; actuates the annular ring in such manner that the sealing joint 26 fixed to this latter ring comes into abutment against the upper extremity of the filtering element 9.

In an alternative form as shown in FIG. 2a, the joint 26 may be designed so as to obtain fluid-tightness simultaneously between the annular ring 27 and the filtering element on the one hand and this same ring and the body on the other. The annular ring, actuated by the spring, compresses this single fluid-tight joint simultaneously against the upper extremity of the filtering element and against the internal wall of the body (or against an annular shoulder 60 welded on the inside of the body).

Also in an alternative form as shown in FIG. 2a, the spring 28 may be replaced by a threaded socket 61 supported on the one hand against the annular ring 27 by means of a first plate 62 screwed on this socket, and on the other hand against an abutment 63 welded inside the body through the intermediary of a second plate 64 freely mounted on the socket.

By screwing the socket, the two plates are moved away from each other and the fluid-tight joint 26 is compressed against the filtering element and against the annular shoulder 60 welded on the inside of the body.

By rotating the crank-handle, the user drives the brush which sweeps the inner wall of the filtering element. The direction of winding of the helix is such that, when the user rotates the crank-handle in a clockwise direction, the particles removed from the wall of the filtering element are carried away towards the drainage opening 7, that is to say in the same direction as the flow of drainage water.

Figure 3:
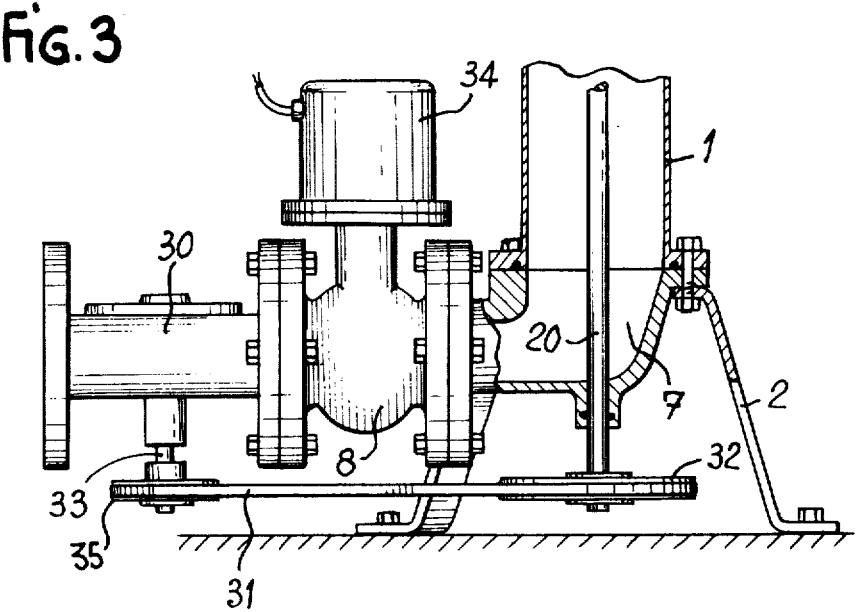
FIG. 3 is a perspective view with parts broken away of the automatic system provided for cleaning the interior wall of the filtering element.

FIG. 3 shows a view in broken perspective of the automatic system which enables the internal wall of the filtering element to be cleaned.

There will be recognized the lower portion of the cylindrical body 1. The valve 8, which temporarily closes the opening 7 located in the longitudinal axis of the body, is assisted and controlled hydraulically or electrically by a member 34 responsive to the difference of pressures between the two chambers, measured by means of the pressure orifices 15 and 16, already described with reference to FIG. 1.

In series with the valve is mounted a turbine 30 which drives, by means of a system of pulleys and belt, the brush intended to clean the filtering element. This system of pulleys and belt is constituted:
on the one hand, by a pulley 35 fixed on the turbine shaft 33;
on the other hand, by a pulley 32 fixed on the lower extremity of the shaft 20 of the brush which, in this case, passes through the lower part of the filter in a fluidtight manner;
finally, by a trapezoidal belt 31.

When the difference in pressures between the annular chamber and the cylindrical chamber has reached a pre-determined value, due to the pressure losses through the partially-blocked filtering element, the member 34 responsive to pressure differences, operates the opening of the assisted valve 8. The water then flows through the opening 7 and actuates the hydraulic turbine 30 which acts by means of the pulleys 32 and 35 and the belt 31 to drive the brush in rotation and brushes the internal wall of the filtering element. The particles thus removed are carried away to the bottom of the filter and from there to the exterior through the valve and the turbine by the drainage orifice.

Figure 4:
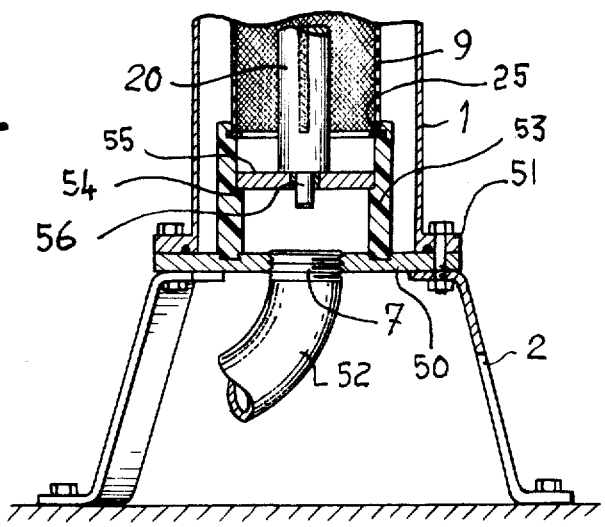
FIG. 4 is a detail view in longitudinal section of an alternative form of construction of the lower portion of the filter.

FIG. 4 represents a detail view in longitudinal section of an alternative form of construction of the lower portion of the filter.

In the case of this alternative form of embodiment, the body 1 is cylindrical and has the same section over its entire height. It is closed at its lower portion in a fluid-tight manner by a bottom 50 screwed on a flange 51 fixed to the cylindrical body 1. This bottom 50 is pierced at its centre with a drainage opening 7 in which is screwed the drainage pipe 52, temporarily closed by a valve (not shown in the drawing).

The filtering element 9 is in abutment against a fluid-tight joint 25 fixed on an annular ring 53 of plastic material, mounted inside the body on the bottom 50. This annular ring 53 is provided internally with a shoulder 54 against which is supported a cross-member 55 pierced at its centre with a hole 56 in which pivots the lower extremity of the shaft 20 of the brush.

As compared with that shown in FIG. 2, this alternative form of construction offers the advantage of being simpler to produce since it is not necessary to weld the cylindrical portion of the body on a flange 57 (see FIG. 2) made by machining and having a more complicated shape than the flange 51.

Figure 5:
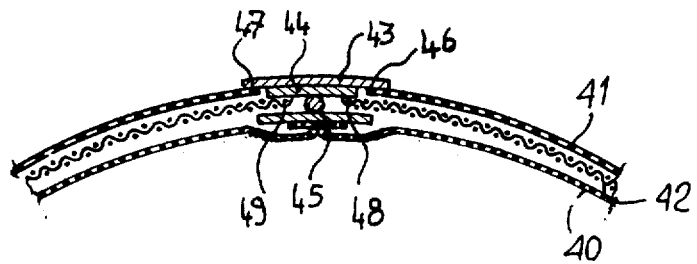
FIG. 5 is a detail view in cross-section of the filtering element.

FIG. 5 is a detail view in transverse section of the filtering element. This filtering element is composed of three concentric cylindrical portions fitted one into the other:
in the interior, a gauze 40 of stainless steel or other metal, or of synthetic threads, the square meshes of which have dimensions between 80 microns and 90 microns: in certain alternative forms of construction, this gauze is covered with a film of Teflon in order to prevent the proliferation of bacteria which are formed on the walls of filtering elements of extreme fineness;

on the exterior, a sheet 41 of stainless steel having a thickness of eight tenths of a millimetre, perforated with square holes having sides of about 12 millimetres, separated by strips of 6 millimetres in width;

between the above two parts, a gauze 42 of stainless steel or a perforated sheet having meshes or holes of about 1 millimetre side.

The gauzes 40, 42 and the sheet 41 are clamped against each other. For the sake of clearness of FIG. 5, these gauzes and sheet have been shown spaced apart from each other, especially in order to show the assembly strips 43, 44 and 45, located facing each other. These assembly strips or beads 43, 44 and 45 are intended to join together the lips such as 46, 47, 48 and 49 of the gauzes and sheets 40, 41, 42, substantially rectangular and previously cut-out on the flat and then rolled to the shape of a cylindrical sleeve.

It will be noted that the coupling strip 44 of the intermediate gauze 42 is housed in the space located between the lips 46 and 47 of the sheet 41.

Similarly, it is emphasized that the assembly bead 45 of the gauze 40 is housed in the space located between the lips 48 and 49 of the intermediate gauze 42.

By means of this interleaved arrangement of the assembly zones of the concentric sheets, the formation is prevented of over-thicknesses and empty spaces which, under the effect of high pressures, cause tearing, especially of the gauze 40, the meshes of which are of very small dimensions.

The formation of over-thicknesses and empty spaces at the level of the assembly zones of the perforated sheet and the gauzes can also be avoided by assembling them together in an entirely different manner.

According to another particularly favorable alternative form of construction, the sheet and the gauzes forming the three parts of the filtering element are assembled together in the following manner.

The lips of the perforated sheet forming the outer part of the filtering element are joined together by means of a continuous electric weld, edge-to-edge, without overthickness. This results in a sleeve, the interior and exterior surfaces of which are perfectly cylindrical and comprise no roughness. The perforated sheet is preferably made from stainless steel with a thickness of eight tenths of a millimetre, and the perforations are square holes of 10 millimetre sides.

The lips of the gauze forming the intermediate portion are joined together by a wire-to-wire micro-weld without over-thickness. This also results in a sleeve, the internal and external surfaces of which are perfectly cylindrical and do not have any roughness. The gauze is preferably of 18/10 stainless steel and is made of wire of 0.5 millimetre in diameter. This gauze is rolled to 30 percent.

The lips of the gauze forming the interior portion are joined together by a welding wheel with an overlap of 5 millimetres. This gauze is preferably of stainless steel and is produced by means of wires of eight one one-hundredths of a millimetre in diameter. The empty space of the meshes is 112 microns, the gauze is rolled to 20 percent and its transparency is 34 percent.

The diameters of the cylindrical parts forming the filtering element are substantially identical in such manner that when once assembled they are closely applied against each other. After having introduced the internal portion into the intermediate portion, they are joined together by spot welding, in particular by four welds at 90° along the generator lines of the filtering element.

The two extremitites of the completely assembled filtering element are supported by a binding hoop of U-shape of stainless steel, having a thickness of three tenths of a millimetre. When once inset, this hoop is fixed on the filtering element by means of four electric welding points at 90°.

The filtering elements designed for flow-rates of 6 cu.m. per hour have a diameter of 100 millimetres and a height of 410 millimetres.

The filtering elements designed for flow-rates of 12 cu.m. per hour have a diameter of 100 millimetres and a height of 815 millimetres, but it is possible to make these filtering elements of smaller or larger dimensions, in particular having diameters between 50 millimetres and 150 millimetres and a height between 200 millimetres and 1500 millimetres.

In a period of normal operation, the difference in pressures between the cylindrical chamber and the annular chamber is generally comprised between 0.1 bar and 2 bars. However, in the event of accidental blockage, this difference in pressures may reach several bars, about 10 bars, without any deformation of the filtering element. The water circulates from the interior of the filtering element to the exterior and its speed of circulation through this element is comprised, in a period of normal operation, between 1 cm. per second and 2 cm. per second.

These speeds of circulation are preferably chosen in such manner as to avoid:

the proliferation of the bacteria which become encrusted on the filtering walls for the lowest speeds;

the carrying away or the forced passage of the particles at the higher speeds of circulation.

What I claim is:

1. A cleansable filter for filtering out of a liquid solid impurities, comprising a. a body communicating with the exterior through two lateral openings and a drainage opening, the lateral openings including an inlet opening for entry of the liquid to be filtered and an outlet opening for discharge of the filtered liquid, the drainage opening being located at the lower end of the body and at the opposite end of the body from the inlet opening, and means for keeping the drainage opening temporarily closed;

b. a filter element mounted inside the body and defining in the interior of the body two concentric chambers, the first of the chambers communicating with the exterior through the temporarily closed drainage opening and through one of the lateral openings, the second of the chambers having an annular form and surrounding the first chamber and communicating with the exterior through the other lateral opening;

c. a brush located within the first chamber and actuatable from the exterior, and bristles on the brush adapted to sweep the internal wall of the filter element;

d. the liquid to be filtered passing into the filter through the inlet opening communicating with the cylindrical chamber and leaving the filter through the outlet opening communicating with the annular chamber, after having passed through the filter element from the interior toward the exterior;

e. the filter element being composed of three concentric cylindrical parts fitted one into the other, including
  i. an innermost part comprising a mesh of stainless steel having pores at least one of whose sides measures at least 40 microns;
  ii. an outermost part comprising a sheet of stainless steel having pores at least one of whose sides measures at least 6 millimeters; and
  iii. an intermediate part located between the said innermost and outermost parts and comprising a sheet of stainless material having pores at least one side of which measures at least five tenths of a millimeter;
  iv. the said three parts being produced from substantially rectangular metal sheet and mesh, previously cut out on the flat and then rolled to the shape of a cylindrical sleeve, the lips of the mesh and the sheet being assembled by assembly means.

2. A cleansable filter as claimed in claim 1, wherein the brush is mounted on a shaft located along the longitudinal axis of the body, one of the extremities of the body being closed in a fluid-tight manner by a removable cover, one of the extremities of the shaft passing through the removable cover, the bristles of the brush being fixed on the shaft and disposed radially along a helix completely enclosing the shaft and having a length sufficient to sweep the internal wall of the filter element, a crank handle being located outside the body and rigidly fixed on the extremity of the shaft passing through the removable cover.

3. A cleansable filter as claimed in claim 2, wherein the filter element is mounted in a removable and fluid-tight manner in the interior of the body by means of a first sealing joint fixed on one of the extremities of the body and abutting against one of the extremities of the filtering element, and of a second sealing joint abutting against the other extremity of the filtering element, the second sealing joint being fixed in an annular ring having an L-shaped section, the annular ring being adapted to cooperate with the interior of the body in a fluid-tight manner, a spring being located inside the body and being supported on the one hand against the annular ring, and on the other hand under the removable cover, and actuating the annular ring in abutment against the filtering element through the intermediary of the said second sealing joint.

4. A cleansable filter as claimed in claim 2, wherein the filter element is mounted inside the body by means of a first sealing joint fixed on one of the extremities of the body and in abutment against one of the extremities of the filter element, and of a second sealing joint fixed on an annular ring ensuring a fluid-tight seal between and extremity of the filter element and the annular ring, and between the annular ring and the internal wall of the filter element, a threaded socket being provided on the inside of the body and being supported on the annular ring through the intermediary of a first plate screwed on the socket, and on an abutment welded inside the body, through the intermediary of a second plate freely mounted on the socket.

5. A cleansable filter as claimed in claim 1, wherein the pores of the said innermost part are square and have dimensions between 40 and 180 microns, the pores in the said outermost part being square and having sides between 6 and 20 millimeters in length, the pores being separated from each other by strips having a width of between 2 and 10 millimeters, and the pores in the said intermediate part being square and having sides between 0.5 and 2 millimeters in length.

6. A cleansable filter as claimed in claim 5, wherein the pores of the said innermost part have dimensions between 80 and 90 microns, the stainless steel outer sheet has a thickness of 0.8 millimeters and pores about 12 millimeters square, separated by strips of 6 millimeters in width, and the pores in the said intermediate part are about 1 millimeter square.

7. A cleansable filter as claimed in claim 1, wherein the drainage opening is located in the longitudinal axis of the body and in its lower portion, the opening being closable temporarily by means of a valve assisted and operated by a member responsive to the difference in pressures between the concentric chambers, the filter further comprising a turbine connected in series with the assisted valve and driving the brush intended to clean the filter element in rotation by means of a mechanical transmission member.

8. A cleansable filter as claimed in claim 7, wherein the mechanical transmission member is a system of pulleys and a belt, comprising pulleys fixed on the shaft of the turbine and on the shaft of the brush which passes through the said lower portion of the body to close the body of the filter in a fluid-tight manner.

9. A cleansable filter as claimed in claim 1, wherein the lips of the perforated sheet forming the outermost part of the filter element are joined together edge-to-edge by means of a continuous electric weld without extra thickness, the lips of the said intermediate part are joined together wire-to-wire by a micro-weld without extra thickness, and the lips of the gauze constituting the innermost member are joined together by a roller-electrode weld with an overlap of a few millimeters.

10. A cleansable filter as claimed in claim 9, wherein the two extremities of the filter element are held in position by a U-shaped binding hoop of stainless steel.

11. A cleansable filter as claimed in claim 10, wherein the intermediate and innermost parts of the filter element are fixed together by spot welding.

* * * * *